United States Patent [19]
Lindh

[11] Patent Number: 5,121,798
[45] Date of Patent: Jun. 16, 1992

[54] SHOCK RELIEVING HORSESHOE PAD

[76] Inventor: DeVere V. Lindh, 1910 Dogwood Dr., SE., Auburn, Wash. 98002

[21] Appl. No.: 624,628

[22] Filed: Dec. 10, 1990

Related U.S. Application Data

[63] Continuation-in-part of Ser. No. 526,643, May 21, 1990, abandoned.

[51] Int. Cl.$^5$ .............................................. A01L 1/00
[52] U.S. Cl. ................................................... 168/12
[58] Field of Search ............................. 168/11, 12, 14

[56] References Cited

U.S. PATENT DOCUMENTS

| | | | |
|---|---|---|---|
| 644,329 | 2/1990 | Meisner | 168/14 |
| 723,889 | 3/1903 | McC. Lord | 168/12 |
| 854,034 | 5/1907 | Handy et al. | 168/12 |
| 4,122,900 | 10/1978 | Barr et al. | 168/12 |
| 4,760,885 | 8/1988 | Benning | 168/11 |
| 4,775,011 | 10/1988 | McCuan | 168/12 |
| 4,878,541 | 11/1989 | Pedersen | 168/14 X |

FOREIGN PATENT DOCUMENTS 274619  7/1927  United Kingdom ................. 168/12

*Primary Examiner*—Robert P. Swiatek
*Attorney, Agent, or Firm*—Robert W. Jenny

[57] ABSTRACT

The subject pad is essentially flat, smooth on one side and having protrusions on the other. It is made of elastomeric material and compressive deflection takes place predominantly as deformation of the protrusions. A preferred configuration of protrusions is straight, parallel, equally spaced ribs, the rib cross section shape being a truncated isosceles triangle with the base toward the smooth side. The shoes are trimmed to match horseshoe and hoof contours on installation and conventional fasteners and techniques are used.

2 Claims, 1 Drawing Sheet

SHOCK RELIEVING HORSESHOE PAD

This application is a continuation-in-part of application Ser. No. 526,643, filed May 21, 1990, now abandoned.

BACKGROUND OF THE INVENTION

1. Field

The subject pad is in the field of apparatus used for protecting horses' hooves and reducing the chances of horses being harmed or injured because of shocks experienced as hooves contact terrain. More specifically it is in the field of pads and other resilient devices used with or incorporated into horseshoes.

2. Prior Art

There is much prior art in this field, both patented and not patented. The patents listed below are a sampling of the patented prior art.

| U.S. Pat. No.: | | |
| --- | --- | --- |
| 28,656 | 641,210 | 1,543,672 |
| 188,620 | 710,999 | 2,103,718 |
| 206,939 | 718,392 | 4,565,250 |
| 514,934 | 806,182 | 4,645,008 |
| 602,046 | 971,138 | 4,765,412 |
| 619,745 | 979,365 | 4,823,883 |
| | 449,368 | |
| | French: | |
| 686,943 | | |

Much of the unpatented prior art relates to various kinds of pads which are used between a horseshoe and a hoof with the shoe and pad fastened to the hoof with conventional horseshoe nails and techniques. Some of the pads are made of felt material, some are made of elastomeric material, flat and foamed, flat and solid and all resilient to some degree.

It is well known in the art that the effectiveness of a pad in relieving shock increases with the amount the pad deflects in compression under the load transmitted by the shoe, through the pad to the hoof. It is also well known that elastomeric material in sheet form is not readily compressible. One significant result of this fact is that in order to make a horseshoe pad from elastomeric sheet and have it deflect enough in compression to provide significant shock relief, i.e. enough to warrant providing the pad, the material must be so soft that it is not durable enough to meet other significant use requirements. Such soft material tends to extrude from between the shoe and hoof and tear away from the nails. Attempts have been made to limit such extrusion and tearing by laminating one or more layers of fabric in the pad. However, the presence of the fabric interferes with the compressibility of the material. A pad with a stabilizing fabric layer is shown in U.S. Pat. No. 4,565,250. This difficulty in providing pads made of material soft enough to provide significant shock relief and durable enough to withstand use has contributed significantly to the failure to meet the longstanding need for a horseshoe pad which provides significant shock relief.

Accordingly, a prime objective of the subject invention is to provide a horseshoe pad which allows greater deflection than prior art pads relative to pad thickness and the applied loads and is durable enough to meet all use conditions for extended periods of use. Other objectives are that a pad meeting the prime objective be useable with conventional horseshoe attaching fasteners and techniques and also be simple and available at cost which clearly warrants use of the pad.

SUMMARY OF THE INVENTION

The subject invention is a horseshoe pad which deflects in compression more than conventional, prior art horseshoe pads and is at least as durable as any known prior art pads.

The pad is made of elastomeric material and shaped in plan view like a horseshoe or the outline of the bottom of a hoof. It is generally flat with one side smooth and protrusions on the other. In a preferred embodiment the protrusions are ribs, parallel and equally spaced. A preferred cross sectional shape for the ribs is a truncated isosceles triangle between the sides and the base in the range 45° to 89° with 60° a preferred angle. The width of the rib surface opposite to the base, termed the top of the rib for purposes of this disclosure, is a fraction of the width of the base, the fraction being in the range of 30% to 95% with 50% being preferred.

Selection of the thickness of the pad minus the height of the ribs is a designer's choice. Making that portion of the pad too thick adds unneeded weight and cost; making it too thin degrades the performance and durability of the pad.

The pad is installed between the horseshoe and the hoof with the smooth side against the hoof and using conventional nails and techniques. Under load the pad deflects in compression with a major portion of the deflection being allowed by deformation of the protrusions. In effect, much of the compressive deflection is converted into tensile and shear strain of the material of the ribs and it is well known in the art that elastomeric materials such as rubber are considerably more compliant in tension and shear than in compression. Accordingly, for a given capacity for deflection in compression, the pad can be made of significantly stronger material than material which could be used to provide the same capability for deflection with compressive stress.

The invention is described in more detail below with reference to the attached drawings.

DETAILED DESCRIPTION OF THE INVENTION

Figure 1:
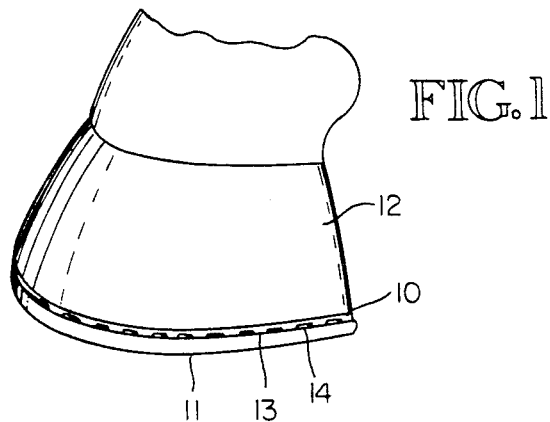
FIG. 1 is an illustration of the subject pad installed between a horseshoe and a horse's hoof.

The subject pad is for use between horseshoes and the hooves to which the horseshoes are attached. It is made of elastomeric material and is essentially flat and shaped in plan view to match the shapes of the horseshoe and the bottom surface of the hoof. The pad is smooth on one side and has protrusions on the other and is installed with the protrusions against the horseshoe, as shown in FIG. 1, a view of the pad 10 installed between a horseshoe 11 and a hoof 12, with the protrusions, protrusion 13 being typical, against top surface 14 of the horseshoe. The protrusions may be made in any of a wide variety of configurations. The protrusion configuration described below has been found to be definitely satisfactory in view of (1) the amount of shock relief relative to the overall thickness of the pad, (2) its durability and (3) the fact that no special techniques or apparatus are needed to install horseshoes with the subject pad. These results have been determined by varied field testing in the United States and Canada. Factors (2) and (3) above are related because the effectiveness of conventional fastening is based on the fact that the pad overall thickness did not appreciably change during the periods between horseshoe changes dictated by other factors. As a result of the testing and the test results a preferred material from which to make the pad is Hytrel ®, G3548, developing a Shore A Durometer 70, by the Dupont company.

Figure 2:
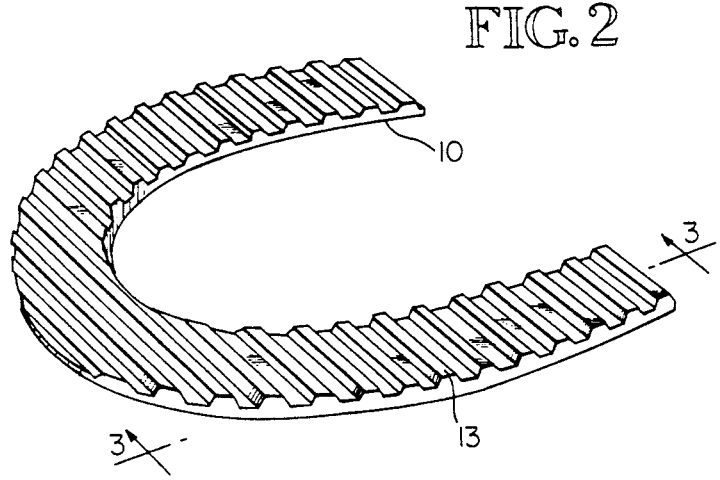
FIG. 2 is a perspective view of the pad of FIG. 1.

FIG. 2 is a view of the pad 10 of FIG. 1, viewed from the side having protrusions. The protrusions, protrusion 13 being typical, are parallel, evenly spaced ribs. The protrusions are transverse to the longitudinal, front-to-rear axis of the pad. A satisfactory overall thickness of the pad, designated by dimension 0 in FIG. 3, a section taken at 3—3 in FIG. 2, is 3/16 of an inch. The overall thickness may be anywhere in the range of 0.1 inch to 0.5 inches, with the thickness of a pad usually uniform but not necessarily so. The height h of the protrusions is expressed as a fraction of the overall thickness and is 0.5 in FIG. 3, a value found to be satisfactory in the testing to date. The protrusion height fraction may range from 0.2 to 0.8 and is usually but not necessarily uniform in a given pad.

The thickness of the pad minus the protrusions, i.e. of the base portion is an important design factor. If the base portion is too thick, the cost and weight of the pad are unnecessarily high. If it is too thin, the holes made by the fasteners do not have sufficient bearing surface area. A preferred thickness of the non-ribbed portion for pads made of the material noted above is 0.1 of an inch.

Figure 3:
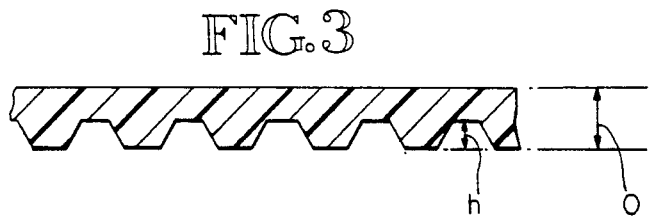
FIG. 3 is a section view taken at 3—3 in FIG. 2.

The cross sectional shape of the protrusions may be any of a wide variety of shapes. One shape found to be satisfactory and shown in FIG. 3 is trapezoidal, more specifically a truncated isosceles triangle, with its base toward the smooth side of the pad. The equal angles between the sides and base of the triangle are in the range of 45° to 89° with 60° a preferred angle. The width of the base of the triangle is in the range of 1 to 10 times its height, measured perpendicularly from its base to its truncated top, with a width of 2 times its height being preferred.

Figure 4:
FIG. 4 is a section view similar to FIG. 3 but showing the pad under compression.

FIG. 4 is similar to FIG 3 but the pad is compressed. The compressive deflection occurs primarily as distortion of the protrusions. The strain in the protrusions under compression load is primarily in tension and shear since elastomeric materials are more compliant in tension and shear than in compression. The compressive deflection relative to load is non-linear with the spring rate increasing with compression.

Hytrel ® is available in a range of hardnesses and the hardness may be expressed as a Shore A durometer rating. The subject pads are effective in a range of hardnesses with Shore A Durometer ratings of 50 to 90 with 70 preferred.

In use the pads may be provided in sheet form from which horseshoe shaped pads are cut or the pads may be made horseshoe shaped in plan view and trimmed to suit each installation. The shoe and pad are attached to the hoof using conventional fasteners and techniques.

It is considered to be understandable from the above description that the subject invention meets its objectives. It provides a horseshoe pad which allows greater deflection than prior art pads relative to pad thickness and the applied loads and is durable enough to meet all use conditions for extended periods of use. It is usable with conventional horseshoe attaching fasteners and techniques. It is also simple and available at cost which clearly warrants use of the pad.

It is also considered to be understandable that while certain embodiments of the subject invention are described herein, other embodiments and modifications of those described are possible within the scope of the subject invention which is limited only by the attached claims.

I claim:

1. A pad for use between a horseshoe and the hoof of a horse, said pad being U-shaped in form and constructed of elastomeric material having first and second sides, said first side being smooth and essentially flat, said second side having a plurality of spaced, parallel protrusions formed over the entire area thereof for placement against the horseshoe, said protrusions extending transversely, with respect to the longitudinal, front-to-rear axis of the pad, across substantially the entire width of the pad, with each protrusion terminating in a flat surface such that the plurality of flat surfaces lie in a common plane.

2. The horseshoe pad of claim 1 which said protrusions are ribs.

* * * * *